(12) United States Patent
Rosenberg

(10) Patent No.: US 9,672,706 B2
(45) Date of Patent: Jun. 6, 2017

(54) METHOD AND A SYSTEM FOR FALSE ALARM REDUCTION IN MOTION DETECTION BY SCANNING CAMERAS

(75) Inventor: Yoav Rosenberg, Jerusalem (IL)

(73) Assignee: PRO TRACK LTD., Jerusalem (IL)

( * ) Notice: Subject to any disclaimer, the term of this patent is extended or adjusted under 35 U.S.C. 154(b) by 1684 days.

(21) Appl. No.: 12/398,966

(22) Filed: Mar. 5, 2009

(65) Prior Publication Data
US 2009/0256912 A1    Oct. 15, 2009

(30) Foreign Application Priority Data
Apr. 10, 2008  (IL) .......................................... 190776

(51) Int. Cl.
| | |
|---|---|
| H04N 7/18 | (2006.01) |
| G08B 13/196 | (2006.01) |
| G01S 3/786 | (2006.01) |
| H04N 5/232 | (2006.01) |
| H04N 5/14 | (2006.01) |

(52) U.S. Cl.
CPC ...... *G08B 13/19643* (2013.01); *G01S 3/7864* (2013.01); *G08B 13/1961* (2013.01); *G08B 13/19602* (2013.01); *H04N 5/232* (2013.01); *H04N 5/144* (2013.01)

(58) Field of Classification Search
CPC .......... G08B 13/19602; G08B 13/1961; G08B 13/19643
USPC ......................................................... 348/154
See application file for complete search history.

(56) References Cited

U.S. PATENT DOCUMENTS

| | | |
|---|---|---|
| 4,337,481 A | 6/1982 | Mick et al. |
| 4,814,779 A | 3/1989 | Levine |
| 5,627,616 A * | 5/1997 | Sergeant et al. ............. 396/427 |
| 2006/0114322 A1* | 6/2006 | Romanowich et al. ...... 348/143 |
| 2010/0013917 A1* | 1/2010 | Hanna et al. ................. 348/143 |

* cited by examiner

*Primary Examiner* — Bryan Lee

(57) ABSTRACT

A method and a system for false alarm reduction in motion detection by scanning cameras. A method for reducing false alarms in scanning camera facilitated motion detection of an object, includes: setting a camera to observe a predefined area; continuously or non-continuously scanning by the camera of the said area for any motion; pausing the camera's scanning if a new motion is detected; analyzing the motion if it has not disappeared, while keeping the object within the camera's field of view; providing an alarm and possibly showing the motion if a motion that should be reported is obtained; and tracking the motion for a period of time at the discretion of the operator.

14 Claims, 6 Drawing Sheets

METHOD AND A SYSTEM FOR FALSE ALARM REDUCTION IN MOTION DETECTION BY SCANNING CAMERAS

CROSS-REFERENCE TO RELATED APPLICATION

The present application claims the benefit of priority of Israeli Patent Application No. 190776, filed Apr. 10, 2008, the content of which are incorporated by reference in its entirety.

BACKGROUND

1. Field of the Invention

The present invention generally pertains to methods and systems for false alarm reduction in motion detection by scanning cameras.

2. Discussion of Related Art

Motion detection with scanning cameras suffers from a relatively high rate of false alarms. These false alarms can be caused by many factors such as stains on the camera glass, sun reflections, dead pixels in a thermal camera, etc., which induce virtual motion relative to the image that is not related to any real moving object in the area.

Another limitation of motion detection with scanning cameras involves the time duration needed by the system to decide that a moving object was detected. Due to the short time that an object is exposed to the camera during the scan, detection should be as fast as possible, otherwise, the object will disappear from the camera field of view before it is detected.

Unfortunately, the short detection time needed causes the system to be very sensitive to false alarms because there is not enough time to analyze the motion and to decide if the motion should be reported or is induced by nuisances such as moving trees that should be filtered out.

In order to provide a higher detection time for a given event, one must increase the time that the object is exposed to the camera by lowering the scan speed. This is an unacceptable solution because it reduces the system area coverage rate.

U.S. Pat. No. 4,337,481, entitled "Motion and intrusion detecting system", describes a method to detect small and fast motion by a scanning cycle composed of 2 scans with different predefined speeds. This method does not give a solution to the long time duration needed to complete a cycle, nor to the false alarms caused by the virtual motions.

U.S. Pat. No. 4,814,779, entitled "Radar system with auxiliary scanning for more dwell time on target", describes a method to use two interconnected radar systems to enable investigation of the target by the secondary radar while the primary radar is in a continuous scanning. This method is aimed to the area of radars where totally different problems are encountered.

Hence, methods and systems for false alarm reduction in motion detection with scanning cameras are still a long felt need.

BRIEF SUMMARY

It is hence one object of the invention to disclose a method for reducing false alarms in scanning camera facilitated motion detection of an object. The method comprising one or more steps selected in a non-limiting manner from a group consisting of setting a camera to observe a predefined area; continuously or non-continuously scanning by the camera of the said area for any motion; pausing the camera's scanning if a new motion is detected; analyzing the motion if it has not disappeared, while keeping the object within the camera's field of view; providing an alarm and possibly showing the motion if a motion that should be reported is obtained; and tracking the motion for a period of time at the discretion of the operator.

It is another object of the invention to disclose a method for reducing false alarms in scanning camera facilitated motion detection of an object. The method comprising one or more steps selected in a non-limiting manner from a group consisting of setting a camera to observe a pre-defined area; continuously or non-continuously scanning by the camera of the said area for any motion; slowing the scanning speed if a new motion is detected; analyzing the motion while keeping the object inside the camera's field of view if the newly detected motion behavior cannot be attributed to virtual motion caused by camera motion; providing an alarm and possibly showing the motion if a motion that should be reported is obtained; tracking the motion for a period of time at the discretion of the operator.

It is another object of the invention to disclose a method for reducing false alarms in scanning camera facilitated motion detection of an object. The method comprising one or more steps selected in a non-limiting manner from a group consisting of setting a camera to observe a pre-defined area; continuously or non-continuously scanning by said camera of the said area for any motion; pointing a secondary camera toward the detected motion and setting it to stop if new motion is detected; analyzing the motion by means of said secondary camera if the motion is still detected by said secondary camera, while keeping the object inside the secondary camera's field of view; providing an alarm and possibly showing the motion if a motion that should be reported is obtained; and tracking the motion for a period of time by said secondary camera at the discretion of the operator.

It is another object of the invention to disclose a system for reducing false alarms in scanning camera facilitated motion detection of an object. This system comprising one or more modules selected in a non-limiting manner from a group consisting of a camera of any type; means for setting a camera to observe a pre-defined area; means for continuous or non-continuous scanning by the camera of the said area for any motion; a motion detection unit; means for pausing scanning by the camera if a new motion is detected by the motion detection unit; a motion verification unit classifying the motion as false and returning the system to scan mode if the motion disappears after the camera was set to stop; a motion analysis unit to decide if the detected motion should be reported, in combination with a unit to keep the object motion inside the camera's field of view; means for providing an alarm and possibly showing the motion if the detected motion should be reported; and means for possibly tracking the motion for a period of time if the detected motion should be reported.

It is still another object of the invention to disclose a system for reducing false alarms in scanning camera facilitated motion detection of an object. This system comprising one or more modules selected in a non-limiting manner from a group consisting of a camera of any type; means for setting a camera to observe a pre-defined area; means for continuous or non-continuous scanning by the camera of the said area for any motion; a motion detection unit; means for slowing the scanning speed of the camera if a new motion is detected by the motion detection unit; a motion verification unit classifying the motion as false and returning the system to scan if the newly detected motion behavior can be attributed to virtual motion caused by camera motion; a motion analysis unit to decide if the detected motion should be reported, in combination with a unit to keep the object motion inside the camera's field of view; means for providing an alarm and possibly showing the motion if the detected motion should be reported; and means for possibly tracking the motion for a period of time if the detected motion should be reported.

It is a last object of the invention to disclose a system for reducing false alarms in scanning camera facilitated motion detection of an object. This system comprising one or more modules selected in a non-limiting manner from a group consisting of a primary camera of any type; at least one secondary cameras of any type; means for setting a primary camera to observe a pre-defined area; means for continuous or noncontinuous scanning by the primary camera of said area for any motion; a motion detection unit on the video of said primary camera; means for pointing a secondary camera toward a motion upon detection by the motion detection unit; a motion verification unit adapted to classify the motion as false and to return the system to scan mode if the motion is not detected in the second camera; a motion analysis unit adapted to decide if the detected motion in the secondary camera should be reported, in combination with a unit that keeps the detected object inside the secondary camera's field of view; means for alarming and possibly showing the motion if the detected motion should be reported; and means for possibly tracking the motion by a secondary camera for a period of time if the detected should be reported.

BRIEF DESCRIPTION OF THE FIGURES

The present invention will now be described, by way of example only, with reference to the accompanying drawings, wherein.

DETAILED DESCRIPTION OF THE INVENTION

Figure 1:
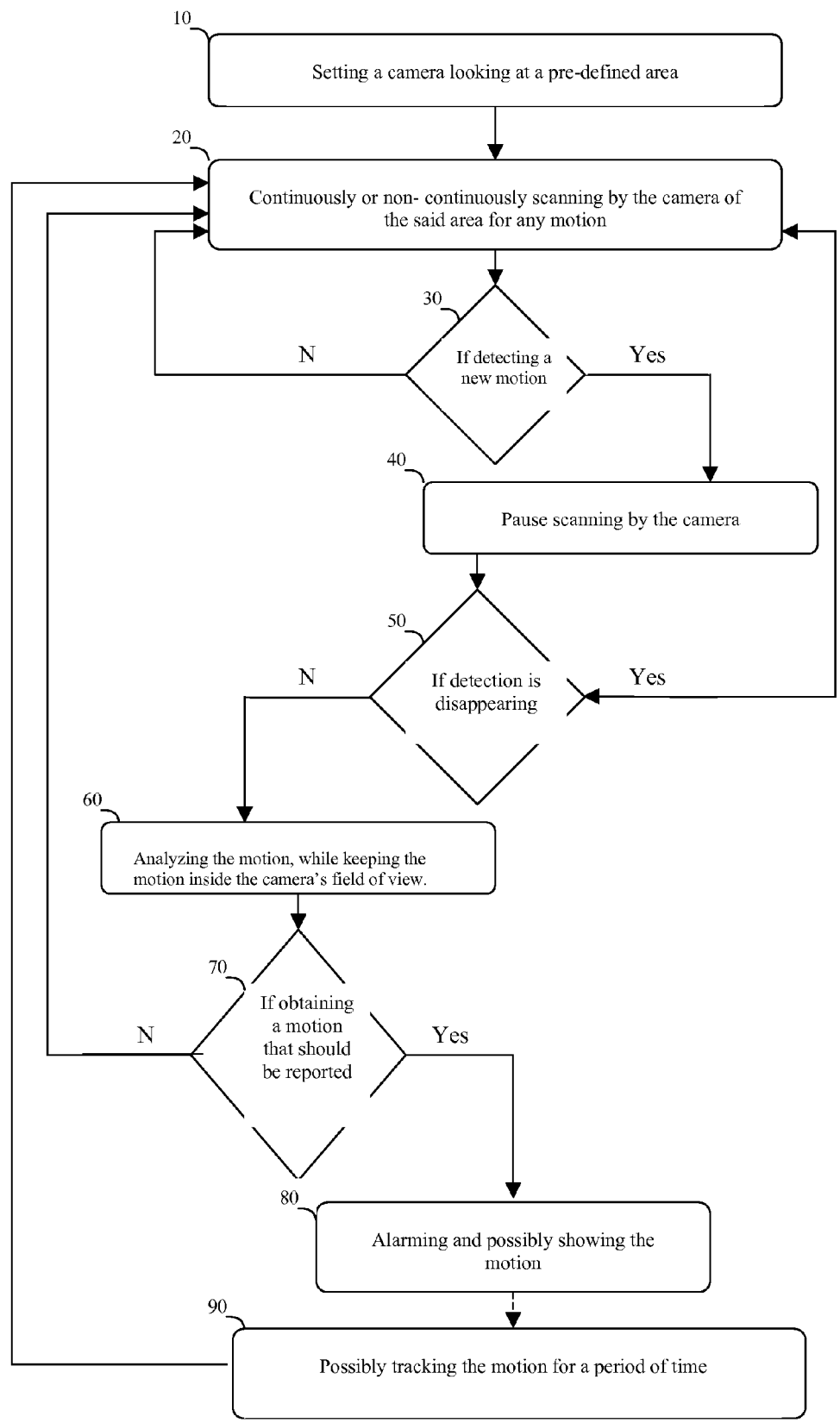
FIG. 1 represents a flow chart of a method according to one embodiment of the invention, adapted for reducing false alarm in scanning cameras facilitating motion detection of an object.

It is appreciated the detailed description and drawings provided relate to a specific preferred embodiment of the present invention. Many modifications and alterations are possible, all of which fall within the spirit and scope of the present invention, as set out in the appended claims. The description provided is meant to provide one example only, and is not intended to limit the invention in any manner whatsoever.

Methods

The method introduced in this patent is intended to decrease the rate of false alarms while retaining high sensitivity of detection and a fast scanning speed of a camera.

The idea is to detect a moving object in two steps.

Step one fast preliminary detection during the camera scan. Motion detection is implemented while the camera scans. Upon detection of a new motion, the camera scanning is stopped and the system enters the second step.

Step two detection verification and analysis phase after camera scanning has stopped. This step is composed of two sub-steps.

Sub-step 2A motion verification: the system checks that the newly detected motion does not disappear while the camera scanning is stopped. If the detected motion did disappear, it is classified as a false alarm because it is considered to be a virtual motion induced by camera motion or other factors such as stains on the camera glass, sun reflections, dead pixels in a thermal camera, etc. which induce virtual motions on the image while the camera moves, motions that are not related to any real moving object in the area.

Sub-step 2B motion analysis: If the motion is still detected after Substep 2A, it is attributed to a real moving object in the world. A motion analysis unit is used to analyze the motion's behavior and to decide if the motion needs to be reported or is only an unimportant background motion such as a moving tree. A possible embodiment of a motion analysis unit is one that checks if the motion is consistent (not going back and forth) and has a displacement exceeding a predefined threshold.

For the motion analysis sub-step 2B, the detected motion should be kept inside the camera's field of view for the time duration needed by the analysis unit to analyze the motion behavior and to decide if the motion should be reported or not. This sub-step can be done while the camera is stopped or scanning. Special care should nonetheless be taken to keep the motion inside the camera's field of view. A preferred way to do it is by setting the camera to track the detected motion if the motion is going to carry the detected object out of the camera's field of view In order to prevent recurrence of camera stops (in step A) due to detection of the same motion, the camera is stopped only upon detection of a new motion. For this reason, it is important to note the locations of all detected motion even when classified as false and to mask out these locations for further detection. Otherwise, the scan will be repeatedly stopped by the same nuisances.

As an alternative to the two step method described above, the camera need not be stopped at all when motion is detected. Instead, the scanning velocity can be slowed down sufficiently that it will be possible to decide if a detected motion is virtual or belongs to a real moving object in the world. In this embodiment, the two step method is as follows:

Step 1: fast preliminary detection during the camera scan—motion detection is implemented while the camera scans. Upon detection of a new motion, the camera scanning speed is slowed down.

Step 2: detection verification and analysis phase after camera scanning has stopped. This step is composed of 2 sub-steps.

Sub-step 2A motion verification: the system checks if the newly detected motion behavior can be attributed to a virtual motion caused by motion of the camera. One possible method for this decision is to check if the detected motion speed changes in proportion to any change of the camera scanning speed. If so, the detection is classified as false because it is considered to be a virtual motion induced by the camera motion.

Sub-step 2B motion analysis: If the motion was not classified as false in sub-step 2A, a motion analysis unit is used to analyze the motion behavior and to decide if the motion need to be reported or is only an unimportant background motion such as a moving tree. This sub-step can be done while the camera is stopped or scanning. Special care should nonetheless be taken to keep the motion inside the camera's field of view, possibly by tracking the motion if it is going to carry the object outside of the camera's field of view.

In another alternative to the above two step method, one or more secondary cameras are engaged in the system. The first step of fast preliminary detection during the camera scan is done by a primary camera while scanning a pre-defined area and motion detection is performed on the video of this camera. The second step of detection verification and motion analysis in done by a secondary camera.

When the primary camera reports a preliminary detection of a newly detected motion, the secondary camera is directed to that motion. Detection verification and analysis is performed on the video of this secondary camera.

In this case, the second step is composed of the following 2 sub-steps.

Sub-step 2A: Motion Verification—The secondary camera is directed to the motion and is set to stop. Motion detection is performed on the secondary camera video. If the detection has disappeared, the detection is classified as false because it is considered to be a virtual motion, probably induced by the first camera motion.

Sub-step 2B: Motion Analysis—If the motion did not disappear in sub-step 2A, a motion analysis unit is used to analyze the behavior of the detected motion in the secondary camera and to decide if the motion need to be reported or is only an unimportant background motion such as a moving tree. This sub-step should be performed while the motion is kept inside the secondary camera's field of view, possibly, by tracking the motion if it is going to carry the object outside of the camera's field of view.

The advantage of using two cameras is that the scanning camera need not stop when motion is detected and thus the area coverage rate of the system increases significantly.

Reference is now made to FIG. 1, schematically presenting a flow chart of a method according to one embodiment of the invention, adapted for reducing false alarms in scanning cameras facilitating motion detection of an object. The method comprises steps of (i) setting a camera to scan a pre-defined area (10); (ii) continuous or non-continuous scanning by the camera of said area for any motion (20); (iii) pausing the scanning by the camera (40) if a new motion is detected (30); (iv) analyzing the motion while tracking the detected motion inside the camera's field of view (60) if the motion has not disappeared (50); (v) providing an alarm and possibly showing the motion (80) if a motion that should be reported is obtained (70); (vi) possibly tracking the motion for a period of time (90); and finally returning to scanning mode (10).

Figure 2:
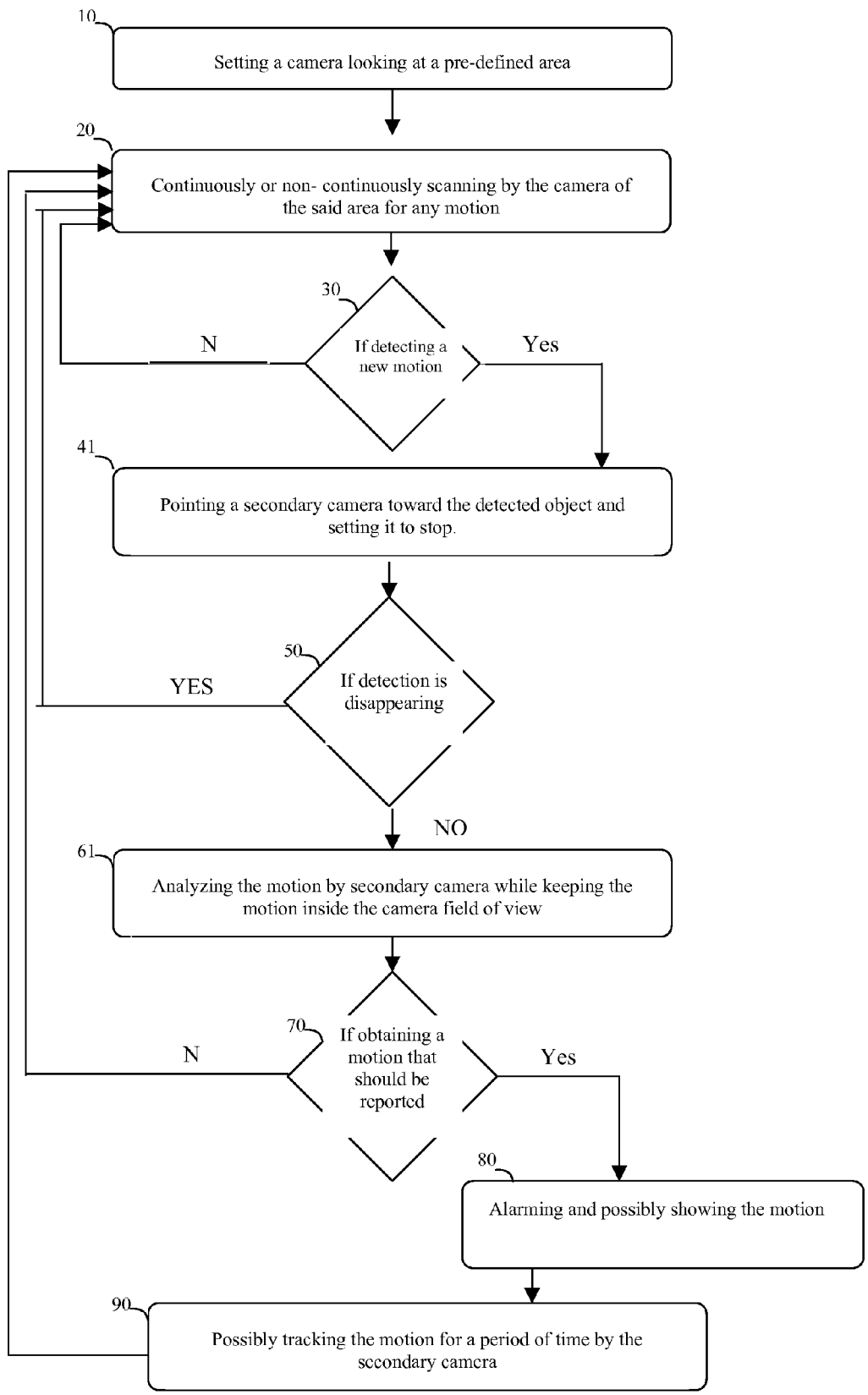
FIG. 2 represents a flow chart of a method according to yet another embodiment of the invention, especially adapted for reducing false alarms in scanning cameras facilitating motion detection of an object.

Reference is now made to FIG. 2, schematically presenting a flow chart of a method according to yet another embodiment of the invention. This method is especially adapted for reducing false alarm in scanning cameras facilitating motion detection of an object. The method comprises steps of (i) setting a camera looking at a pre-defined area (10); (ii) continuous or non-continuous scanning by the camera of said area for any motion (20); (iii) pointing a secondary camera toward the detected motion (41) if a new motion is detected (30); (iv) analyzing the motion on the video of the secondary camera while keeping the detected motion inside the secondary camera's field of view (61) if the motion has not disappeared (50); (v) providing an alarm and possibly showing the motion (80) if a motion that should be reported is obtained (70); (vi) possibly tracking the motion for a period of time by the secondary camera (90).

Figure 3:
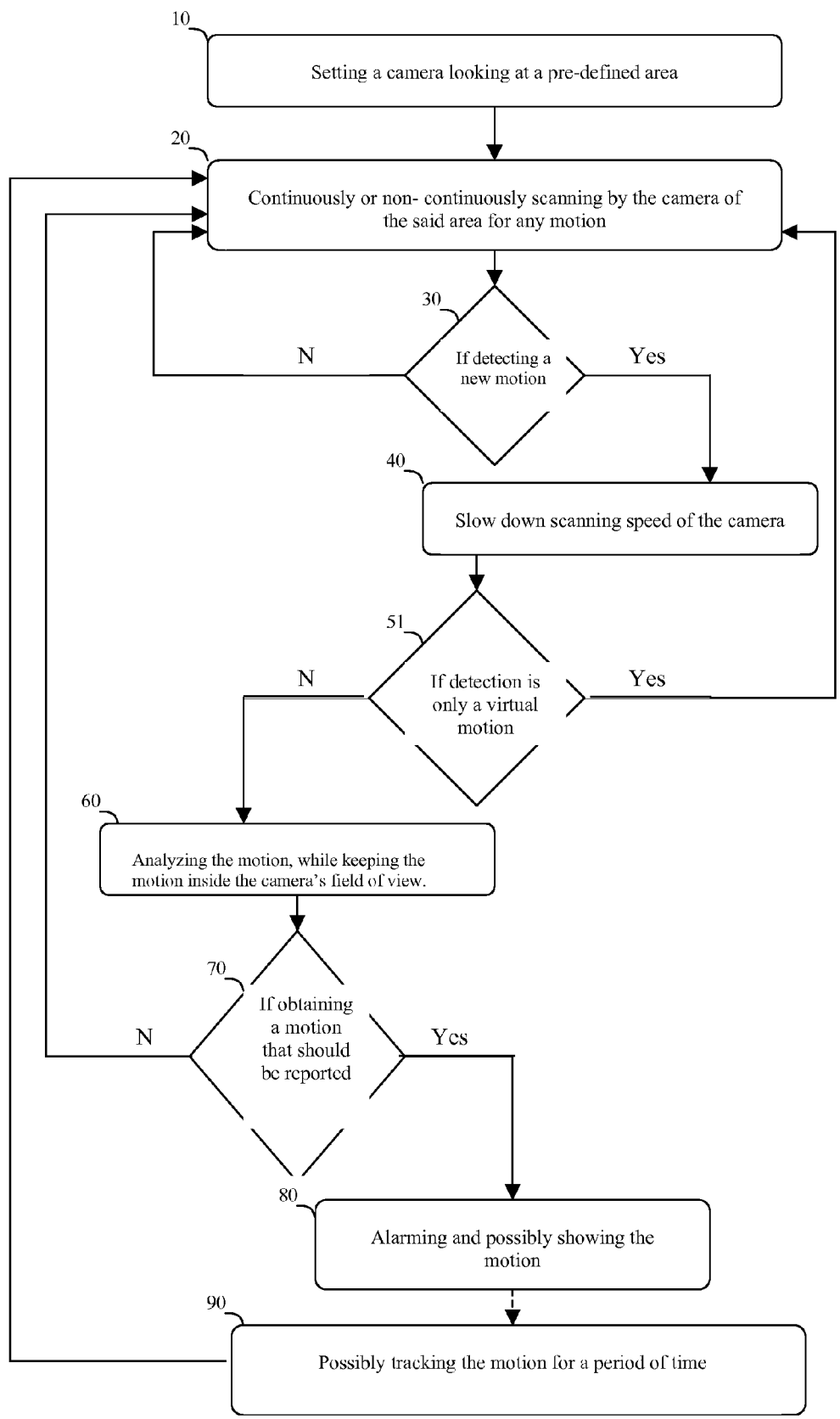
FIG. 3 represents a flow chart of a method according to yet another embodiment of the invention, especially adapted for reducing false alarms in scanning cameras facilitating motion detection of an object using a secondary camera.

Reference is now made to FIG. 3, schematically presenting a flow chart of a method according to one embodiment of the invention, adapted for reducing false alarms in scanning cameras facilitating motion detection of an object. The method comprises steps of (i) setting a camera to look at a pre-defined area (10); (ii) continuously or non continuously scanning by the camera of the said area for any motion (20); (iii) slowing down the scanning by the camera (40) if a new motion is detected (30); (iv) analyzing the motion while keeping the motion inside the camera's field of view (60) if the newly detected motion behavior can't be attributed as a virtual motion caused by the camera motion (51); (v) providing an alarm and possibly showing the motion (80) if a motion that should be reported is obtained (70); (vi) possibly tracking the motion for a period of time (90); (vii) returning to scanning mode (10).

Figure 4:
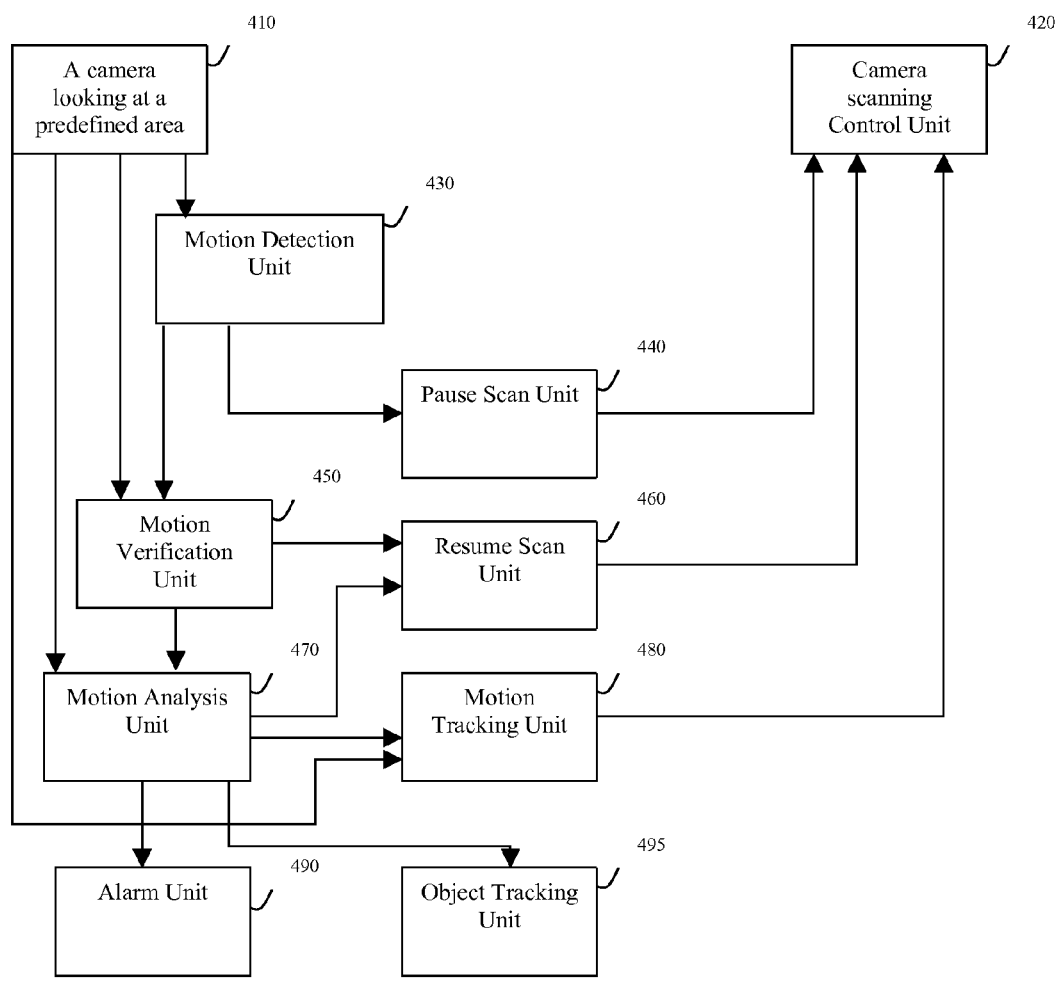
FIG. 4 represents a block diagram of a system according to one embodiment of the invention, especially adapted for reducing false alarms in scanning cameras facilitating motion detection of an object.

Reference is now made to FIG. 4, schematically presenting a block diagram of a system according to one embodiment of the invention. This system is especially adapted for reducing false alarms in scanning cameras, facilitating motion detection of an object. The system comprises interconnected units of a camera looking at a predefined area (410), a camera scanning motion control unit (420), a motion detection unit (430) a camera scan pausing unit (440), a motion verification unit (450), a camera scan resume unit (460), a motion analysis unit (470), a motion tracking unit (480), an alarm unit (490), and an optional object tracking unit (495).

Figure 5:
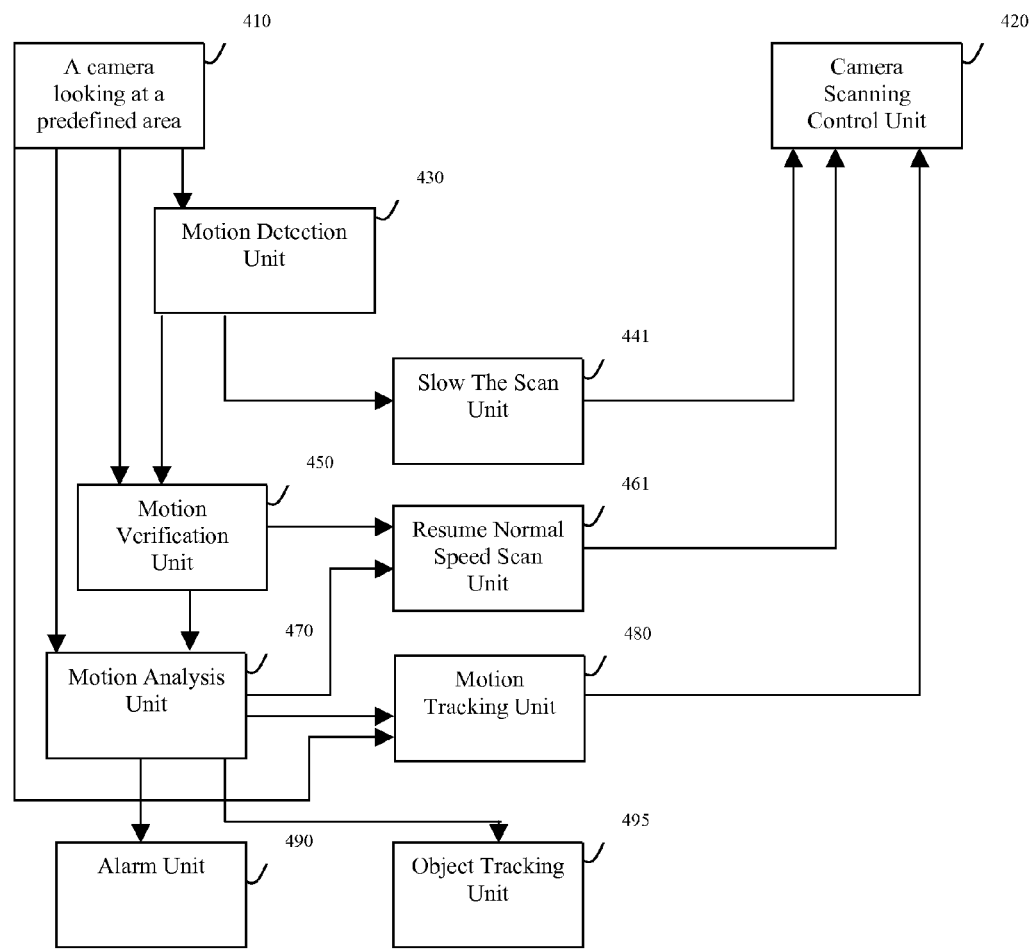
FIG. 5 represents a block diagram of a system according to yet another embodiment of the invention, especially adapted for reducing false alarms in scanning cameras facilitating motion detection of an object.

Reference is now made to FIG. 5, schematically presenting a block diagram of a system according to one embodiment of the invention. This system is especially adapted for reducing false alarms in scanning cameras, facilitating motion detection of an object. The system comprises interconnected units of a camera looking at a predefined area (410), a camera scanning motion control unit (420), a motion detection unit (430) a camera scan slowing unit (441), a motion verification unit (450), a camera scan resume unit (460), a motion analysis unit (470), a motion tracking unit (480), an alarm unit (490), and an optional object tracking unit (495).

Figure 6:
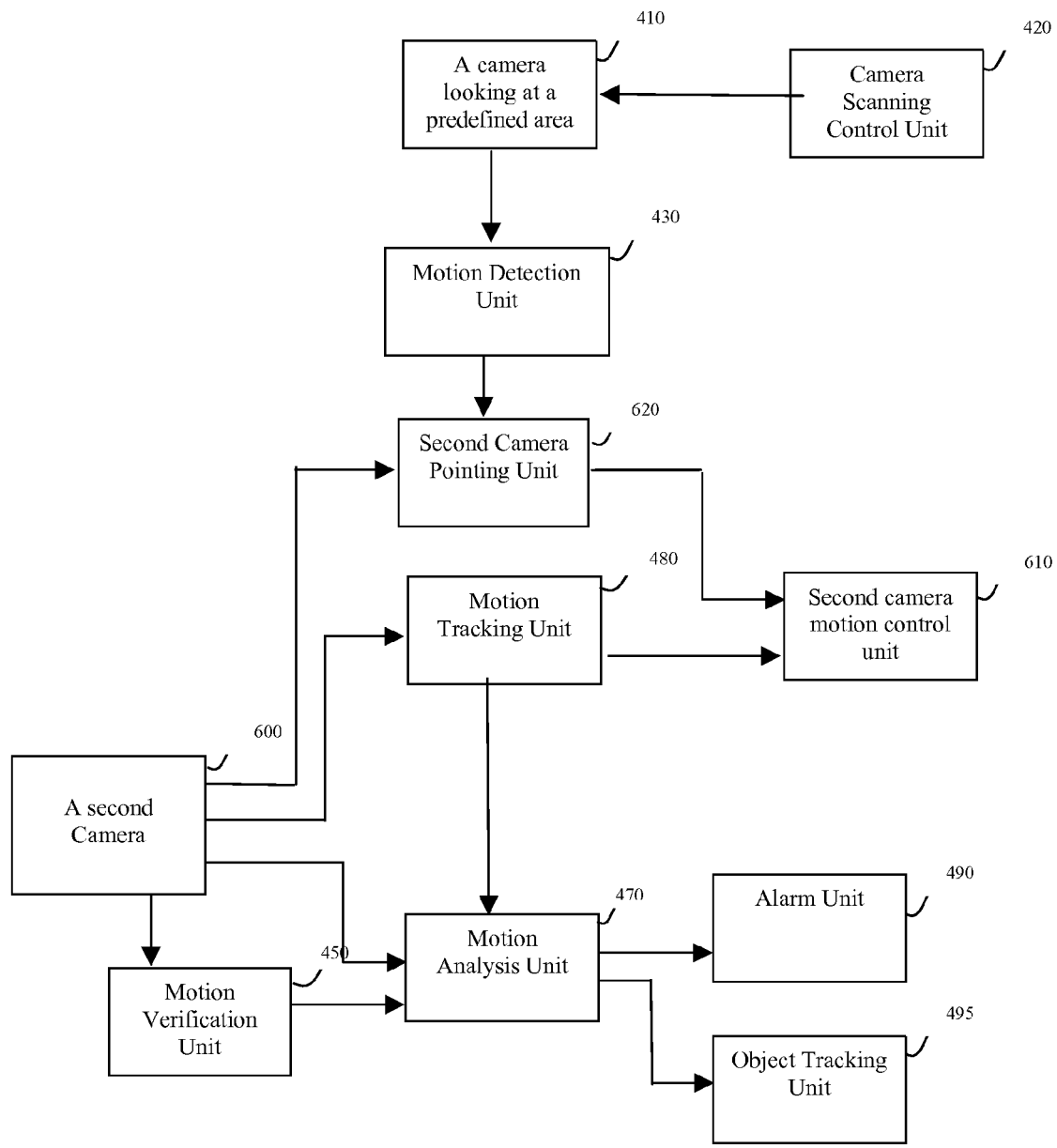
FIG. 6 represents a block diagram of a system according to yet another embodiment of the invention, especially adapted for reducing false alarms in scanning cameras facilitating motion detection of an object using a secondary camera.

Reference is now made to FIG. 6, schematically presenting a block diagram of a system according to one embodiment of the invention. This system is especially adapted for reducing false alarms in scanning cameras, facilitating motion detection of an object. The system comprises interconnected units of a camera looking at a predefined area (410), a camera scanning motion control unit (420), a motion detection unit (430) a second camera unit (600), second camera motion control unit (610), second camera pointing unit (620), a motion verification unit (450), a motion analysis unit (470), a motion tracking unit (480), an alarm unit (490), and an optional object tracking unit (495).

EXAMPLES

Example 1

A scanning system with a single camera:

A camera with FOV (field of view) of 2 degrees is scanning a strip of 40 degrees (20 FOVs). The camera movements can be controlled by the system.

Assume that the system can detect motion while the camera is scanning and the detection resolution of the system is four pixels, i.e. the minimal translation that can be detected by the system is four pixels.

Let us assume the following system requirements: In order to provide an alert, the camera must observe a translation of more than 16 pixels at a speed of more than 2 pixels/second; any motion failing to meet this criterion will be considered unimportant background motions. The camera's scan rate should be as fast as possible and the alert must be provided in no more than one minute, assuming that no more than 2 moving objects exist in the scanning strip.

With these requirements, and if not using any of methods described herein, eight seconds are needed to detect the slowest motion. Therefore, a motion must be exposed to the camera for at least 8 seconds, yielding a maximal possible scanning rate of ⅛ FOV per second and a full scan without interrupts of 160 seconds.

This scan rate is much slower than the specification. In order to achieve the specifications, the scanning rate should be above ⅓ FOV per second. In this case, the slowest object will translate 6 pixels and the system should be tuned to detect every motion above 6 pixels in order not to miss any motion. This will cause the system to report many unimportant motions and the false alarm rate will be high.

By using the one camera method described herein, The preliminary motion threshold for the first step is set to 4 pixels, which is the minimal possible threshold supported by the system. Therefore, for the above specifications, an object must be exposed to the camera for at least 2 seconds. This yields a maximal scanning rate of ½ FOV/second and a full scan without interrupts of 40 seconds, which is 4 times faster than before.

When a new motion is detected, the scan stops. If the motion disappears during the next two seconds the scan resumes immediately, if the motion persists, the system waits 4 more seconds such that a translation of 16 pixels will be detected. During this time, the system can be stopped or can continue the scan as long as the detected motion is kept inside the camera field of view. If the object is going to exit the field of view, a tracking mechanism is used to move the camera such that the motion will remain inside the field of view.

If two moving objects exist in the scanning strip, the scan will have two stops of 8 seconds each, and the total scan will take 56 seconds, which falls inside the requirements.

Example 2

A scanning system with a scanning camera and a secondary camera:

A camera with FOV (field of view) of 2 degrees is scanning a strip of 40 degrees (20 FOVs). The camera movements can be controlled by the system.

Assume that the system can detect motion while the camera is scanning and the detection resolution of the system is four pixels, i.e. the minimal translation that can be detected by the system is four pixels.

The system is equipped with a secondary camera. When a new motion is detected by the scanning camera, the secondary camera can be directed to this detected motion in less than one second such that the detected motion will be approximately in the center of the field of view.

The secondary camera can track the motion if the object is going to exit the field of view.

Let assume the following system requirements: In order to provide an alert, the camera must observe a translation of more than 16 pixels having a speed above 2 pixels/second; other motions are considered to be unimportant background motions. The camera's scan rate should be as fast as possible and the alert must be provided in no more than and one minute at most under the assumption that no more that 10 motions exist in the scanning strip and that no more that one motion exists simultaneously.

By using the one camera method described herein, the scan time will take 100 seconds, far beyond the system specifications.

Nevertheless, using a two camera system, the primary camera will scan the entire area without stopping. The preliminary motion threshold for the scanning camera is set to 4 pixels, which is the minimal possible threshold supported by the system. Therefore, for the above specifications, an object must be exposed to the camera for at least 2 seconds. This yields a maximal scanning rate of ½ FOV/second and a full scan rate of 40 seconds.

When a new motion is detected, the secondary camera is directed to this motion. One second may have been lost while the secondary camera was directed to the appropriate location and the object may have moved 2 pixels at this time.

Therefore, the secondary camera remains static for 6 seconds and obtains motion detection around the center of the field of view. The motion detection threshold is set to 12 pixels. If a motion above this threshold is detected an alert is issued. If the object is going to exit the camera's field of view, a tracking mechanism is used to move the secondary camera such that the motion will remain inside the field of view.

After this time, the secondary camera is free to examine other objects.

With this setting, any translation of 14 pixels or more will cause the system to provide an alert. This is less robust than the threshold of 16 pixels allowed by a single camera setting; the overall scanning speed is much faster than with the single camera option, however.

What is claimed is:

1. A method for reducing false alarms in scanning camera facilitated detection of object motion, said method comprising:
   setting camera means to observe a predefined area at a predetermined scan speed;
   performing a preliminary scan of said area for any motion by scanning said camera means at a predetermined preliminary scanning speed; and,
   if motion is detected:
   changing said scan speed of said camera means from said preliminary scanning speed in a manner selected from the group consisting of pausing said scanning and slowing said scanning;
   verifying that a measured speed of said detected motion does not exceed a predetermined threshold value when said scanning speed is changed;

if said measured speed of said detected motion exceeds said predetermined threshold value when said scanning speed is changed:
following said motion by keeping said object motion within a field of view of said camera means for a predetermined duration of time;
analyzing said motion;
deciding if said motion should be reported; and,
reporting said motion if said motion should be reported;
if said measured speed of said detected motion does not exceed said predetermined threshold value when said scanning speed is changed:
returning said scanning speed to said preliminary scanning speed.

2. The method according to claim 1, wherein said step of changing said scan speed from said preliminary scanning speed comprises:
pausing said scanning of said camera; and,
verifying that said motion has not disappeared.

3. The method according to claim 1, wherein said step of changing said scan speed from said preliminary scanning speed comprises:
slowing said scan speed of said camera; and,
verifying that said measured speed of said detected motion does not change more than a predefined threshold.

4. The method according to claim 1, wherein said camera means comprises at least one camera.

5. The method according to claim 4, wherein said camera means comprise a primary camera and a secondary camera, the primary camera configured for scanning said area for any motion and the secondary camera is configured for orienting toward said detected motion and stopping if a motion is detected by said primary camera.

6. The method according to claim 1, wherein said camera means comprises one camera.

7. The method according to claim 1, wherein said step of changing said scan speed from said preliminary scanning speed comprises:
slowing said scan speed of said camera; and,
verifying that said measured speed of said detected motion does not change in proportion to said change in said scan speed.

8. A system for reducing false alarms in scanning camera facilitated motion detection of an object, said system comprising:
camera means (410);
scanning means by said camera means of said area for any motion;
a motion detection unit (430);
a motion verification unit (450) configured to verify motion by verifying that a speed of a detected motion changes by more than a predetermined threshold value when said scanning speed of said scanning means is changed;
a scanning control unit (420) configured:
to set said camera means to observe a pre-defined area at a predetermined preliminary scanning speed and at a predetermined scanning speed;
to change said scan speed of said camera means from said preliminary scanning speed in a manner selected from the group consisting of pausing said scanning and slowing said scanning if motion is detected by said motion detection unit; and,
to direct said camera means to follow a detected motion by keeping said detected motion within a field of view of said camera means for a predetermined duration of time if said motion detection unit detects motion and said motion verification unit determines that said speed of said detected motion changes by more than said predetermined threshold value when said scanning speed of said scanning means is changed;
a camera scan resume unit (460) configured to return the camera means to scan if said detected motion was not verified;
a motion analysis unit (470) configured to analyze said verified motion to decide if said verified motion should be reported, in combination with a motion tracking unit (480) configured to follow said object motion by keeping said motion within a field of view of said camera means; and,
an alarm unit (490) configured to report the motion if said verified motion should be reported.

9. The system according to claim 8, wherein said motion verification unit is configured to pause the camera scanning and to verify that said detected motion has not disappeared.

10. The system according to claim 8, wherein said motion verification unit is configured to change said scanning speed of the camera and to verify that the speed of the detected motion does not change by more than a predefined threshold value.

11. The system according to claim 8, wherein said camera means comprises at least one camera.

12. The system according to claim 11, wherein said camera means comprise a primary camera and a secondary camera, the primary camera configured for scanning said area for any motion and the secondary camera is configured for orienting toward said detected motion and stopping if a motion is detected by said primary camera.

13. The system according to claim 8, wherein said camera means comprises one camera.

14. The system according to claim 8, wherein said a motion verification unit (450) is configured to verify that when said scanning speed of said scanning means is changed, said speed of said detected motion does not change in proportion to said change in said scanning speed of said scanning means.

* * * * *